Figure 1:
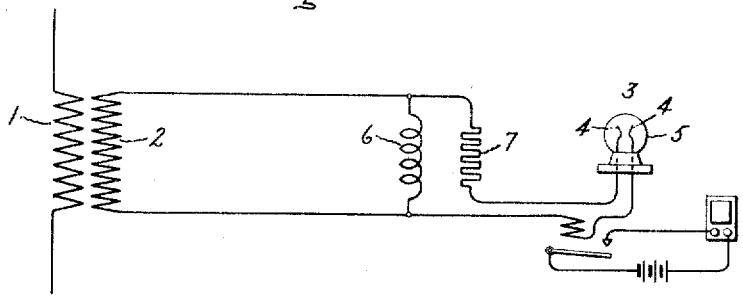

E. E. F. CREIGHTON.
PROTECTIVE DEVICE.
APPLICATION FILED JAN. 13, 1914.

1,284,609.

Patented Nov. 12, 1918.

WITNESSES:

INVENTOR:
ELMER E. F. CREIGHTON,
BY
HIS ATTORNEY.

UNITED STATES PATENT OFFICE.

ELMER E. F. CREIGHTON, OF SCHENECTADY, NEW YORK, ASSIGNOR TO GENERAL ELECTRIC COMPANY, A CORPORATION OF NEW YORK.

PROTECTIVE DEVICE.

1,284,609.  Specification of Letters Patent.  Patented Nov. 12, 1918.

Application filed January 13, 1914. Serial No. 811,840.

*To all whom it may concern:*

Be it known that I, ELMER E. F. CREIGHTON, a citizen of the United States, residing at Schenectady, in the county of Schenectady, State of New York, have invented certain new and useful Improvements in Protective Devices, of which the following is a specification.

My invention relates to the protection of systems of electrical destribution and more particularly to the indication and detection of high frequency disturbances or other overvoltage phenomena upon electrical transmission lines.

The object of my invention is to provide a novel detecting and indicating apparatus for use upon a transmission system to detect the occurrence of high frequency disturbances upon the system, due to either a faulty feeder or to other transient causes, unmistakably indicating the high frequency condition to an operator. A further object of my invention is to provide a protective device which is accurately selective to indicate when the high frequency condition on the system is due to a faulty feeder and not only select the feeder upon which the fault occurs but also the faulty phase of that feeder.

The occurrence of high frequency disturbances upon modern transmission systems, due to a faulty feeder or to other transient causes upon the system, such as lightning discharges and other surges, is well known and various means have been devised to either conduct these disturbances to ground or to dissipate their energy as heat. The present devices used, give no visual or audible indication to the operator when a high frequency disturbance occurs upon the system, so that he often acts to the detriment of service conditions, merely because he is unaware of the existence of a destructive high frequency condition. It is most essential for an operator to know when these high frequency disturbances occur upon the system, by means of some unmistakable signal such as a visual or audible indication which cannot be misinterpreted. Again it is essential, to maintain the continuity of the service, that the protective device not only indicate the presence of a high frequency condition upon the line but also differentiate, to a certain degree, between the causes for such high frequency condition, so that the trouble can be quickly located and remedied.

Of the many causes for high frequency disturbances, those due to an induced lightning discharge and to a faulty feeder in the system, are perhaps the most important, a faulty feeder being caused from a short circuit or an arcing or metallic ground on the feeder.

My invention can not only be used to detect a high frequency disturbance upon the system due to a transient cause, such as an induced lightning discharge, but also to detect a faulty feeder and is selective to indicate not only the feeder upon which the fault occurs but also the faulty phase of the faulty feeder.

A protective device which will perform these functions, is the subject matter of this application, the novel features of which will be definitely indicated in the claims appended hereto.

Figure 2:
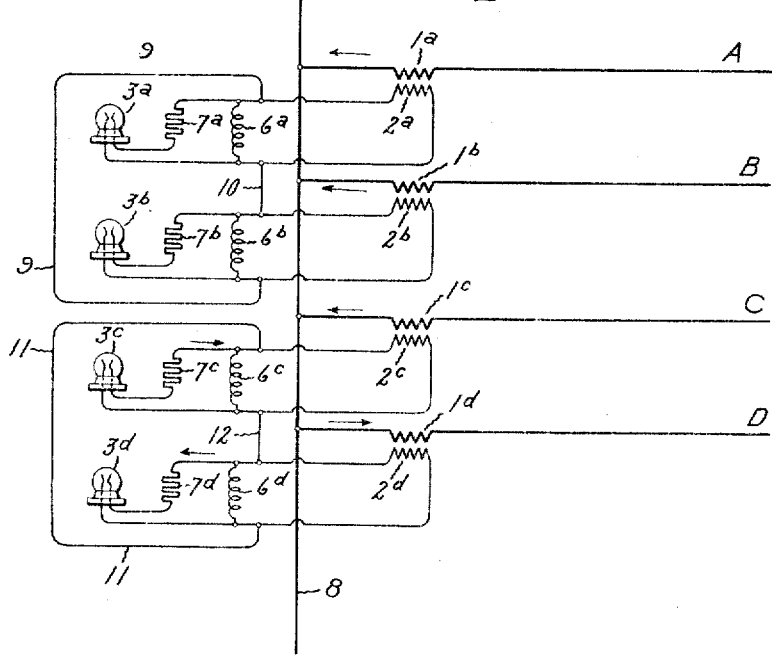

My invention will be more clearly understood by reference to the accompanying drawings in which Figure 1 shows, diagrammatically, and merely for purposes of illustration, an electrical conductor embodying the novel features of my invention, and Fig. 2 shows, diagrammatically, my invention as applied to the protection of the feeders of a transmission system whereby the protective device is made accurately selective to indicate not only the faulty feeder but also the faulty phase of the faulty feeder.

In Fig. 1 is shown the primary 1 of a current transformer located in one phase of the line to be protected. The circuit through the secondary 2 of the curent transformer forms an auxiliary circuit which is closed through a high frequency detector 3. Any device which will give a visual indication or otherwise indicate a high frequency disturbance can be used, but what I prefer to use in this connection, is a detector comprising terminals 4, preferably of the horn gap type, suitably mounted in an evacuated bulb 5 to form a spark gap. In the auxiliary circuit arranged in shunt with the detector 3 is a reactive coil 6, the inductance of which is so proportioned, that under normal conditions of the circuit, the drop in voltage due to impedance, across the reactive coil, is not sufficient to cause a discharge across the vacuum gap. In this manner, under normal operating conditions, the reactive coil acts as a shunt, offering little impedance to the passage of line current and not allowing sufficient current to pass through the remainder of the circuit to cause a discharge across the vacuum gap; thus normally the detector 3 is dark, that is, it does not glow.

If, however, a high frequency disturbance due to a faulty feeder or to any other cause, should occur upon the primary circuit, then a current of high frequency is likewise induced in the auxiliary circuit through the secondary 2. The reactive coil 6 now offers great impedance to the passage of the induced high frequency current and the high frequency oscillations pass on through the remainder of the auxiliary circuit discharging across the terminals 4 of the high frequency detector 3, in the form of a visual brush discharge. Dependent upon the duration of the high frequency condition upon the line, the visual brush discharge will vary from a momentary flash to a continuous glow.

The adaptability of my protective device for detecting and indicating the occurrence of high frequency disturbances upon a transmission system, due to a faulty feeder, is shown in Fig. 2 in which only one bus 8 of a three-phase transmission system is shown and only one phase of each of four parallel feeders, these phases being similar ones and represented by the conductors A, B, C and D respectively. Each of the three phases of each feeder has embodied therein the novel features of my invention, but, merely to simplify the drawing and description, the protective device is shown as embodied in only one phase, it being understood that the remaining phases are similar in every detail.

To accurately select a feeder of the transmission system which is at fault, due to an arcing or metallic ground or to any condition upon the feeder causing high frequency disturbances, the feeders of the system are paired or connected together to obtain a differential action between them. Such an arrangement is shown by the wires 9 and 10 in the auxiliary circuit, which connect or pair the conductors A and B together, that is, the circuit through the secondary 2ª is connected to the circuit through the secondary 2ᵇ. In a similar manner conductors C and D are connected together by wires 11 and 12.

Under normal operations, the direction of current flow through the conductors A, B, C and D and hence through their respective primaries 1ª, 1ᵇ, 1ᶜ and 1ᵈ, is always the same at any one instant, reversing in direction through all the conductors according to the periodicity of the generating current. During normal operations, therefore, according to the connections shown, the auxiliary circuits through the secondaries 2ª and 2ᵇ and the auxiliary circuits through the secondaries 2ᶜ and 2ᵈ are connected so that the electromotive forces in each pair of circuits is in series conjunction, that is aid each other. The current flow in one circuit is from secondary 2ª, through conductor 9, secondary 2ᵇ and conductor 10 to secondary 2ª and the current in the other circuit is from secondary 2ᶜ, through conductor 11, secondary 2ᵈ, conductor 12 to secondary 2ᶜ. There will be, therefore, no current flow through the detectors 3ª, 3ᵇ, 3ᶜ and 3ᵈ so that under normal operations they will not glow.

Assume now that a fault occurs upon one of the parallel feeders of the transmission system, for instance upon the conductor D and that such a fault occurs in the manner of an arcing ground which causes upon the conductor D a high frequency condition. When this condition occurs, the direction of current flow at any one instant through the conductor D is opposite to that of the flow in conductors A, B, and C, and the amount of current flowing in conductor D is approximately three times the amount flowing in either of the three other conductors.

The occurrence of a fault upon the conductor D, such as an arcing ground, would produce no effect in the auxiliary circuits of the conductors A and B as the currents tending to flow in their circuits are still in series conjunction and the current flow is through the same circuit as during normal operation. The high frequency detectors 3ª and 3ᵇ, therefore remain unaffected.

In the auxiliary circuits through the secondaries of conductors C and D, however, a change of conditions has taken place. At any one instant the current flow in conductor D is different in direction from the current flow in conductor C and the amount of current flow is approximately three times that of conductor C. The flow of current in the conductor C which is now of high frequency is in the direction of the arrow. This current induces in the secondary 2ᶜ, a high frequency current which flows in the auxiliary circuit in the direction of the arrow, through the resistance 7ᶜ and high frequency detector 3ᶜ discharging across the terminals in the form of a visual brush discharge. The flow of current in the conductor D is in the direction shown by the arrow and also of high frequency. This current induces in the secondary 2ᵈ a current which flows in the auxiliary circuit in the direction of the arrow, through the high frequency detector 3ᵈ, discharging across its vacuum gap. Since the voltages induced in the secondaries 2ᶜ and 2ᵈ are now in opposition, conductors 11 and 12 no longer act to connect the two auxiliary circuits and therefore the currents in the secondaries 2ᶜ and 2ᵈ will flow only in their respective circuits.

As the flow of current in the auxiliary circuit of conductor D is approximately three times that of the flow in the auxiliary circuit through conductor C' and as this current is of high frequency caused by the arcing ground on the conductor D, the visual brush discharge across the vacuum gap of the detector $3^d$ is practically three times greater and hence at least three times brighter than the discharge across the vacuum gap of the detector $3^c$. As the arcing ground causes practically a continuous high frequency discharge, the glow in the detectors $3^c$ and $3^d$ will be for all visual purposes continuous.

It will thus be seen that in a transmission system embodying the novel features of my protective device that when a fault occurs upon a feeder of the system, it is detected and unmistakably indicated to the operator. By merely noticing the difference in the intrinsic brightness of the high frequency detectors, the feeder which is at fault can be easily distinguished and not only the faulty feeder but also the faulty phase of the feeder can be as easily distinguished as the detectors upon the phases other than the one upon which the fault occurs will be unaffected and will not glow.

I have described my protective device as including a visual high frequency detector, but instead of a visual detector, any other suitable form of detector may be used. In some cases, for example, it may be desirable to have both an audible and a visual detector present in the system as shown in Fig. 1. Such an audible detector might be a buzzer or any suitable alarm bell included in a local circuit through a battery, which circuit is closed to ring the alarm when a high frequency occurs upon the auxiliary circuit.

The novel features of my invention may be embodied in other forms than that shown and described, as will be suggested to one skilled in the art and I, therefore, do not wish to be restricted to the specific arrangement shown, but intend to cover by the appended claims, all changes and modifications within the spirit and scope of my invention.

What I claim as new and desire to secure by Letters Patent of the United States, is:—

1. The combination with a line conductor, of an arcing ground detector comprising, an auxiliary circuit arranged in series relation with said line conductor, a brush discharging device in said circuit, and a reactance shunting said device arranged to allow the passage of current of normal frequency but to force all current of the frequency caused by an arcing ground through said device whereby an arcing ground on said conductor is visually indicated.

2. In a system of distribution, the combination of a plurality of feeders, and an auxiliary circuit in series relation with each of said feeders comprising, terminals mounted within an evacuated vessel to form a spark gap, and an inductance in shunt relation with said spark gap, said plurality of feeders being paired together through their respective auxiliary circuits to produce a differential action between them whereby said spark gaps are rendered unresponsive to normal conditions upon the feeders but rendered responsive to the occurrence of a high frequency condition upon a feeder to visually indicate upon which feeder the high frequency condition occurs.

3. In a system of distribution, the combination of a plurality of feeders, and an auxiliary circuit in series relation with each of said feeders comprising, a high frequency indicator and an inductance in shunt relation with said indicator, said plurality of feeders being paired together through their respective auxiliary circuits to produce a differential action between them whereby said high frequency indicators are rendered unresponsive to normal conditions upon the feeders but rendered responsive to the occurrence of a high frequency condition upon a feeder to selectively indicate the feeder upon which the high frequency condition occurs.

4. In a system of distribution, the combination of a plurality of polyphase feeders, and an auxiliary circuit in series relation with each phase of each of said feeders comprising, a high frequency indicator, and an inductance in shunt relation with said indicator, said plurality of feeders having similar phases paired together through their respective auxiliary circuits to produce a differential action between them whereby said high frequency indicators are rendered unresponsive to normal conditions upon the phases of the feeders but rendered responsive to the occurrence of a high frequency condition upon any phase of any feeder to selectively indicate not only the feeder but also the phase of the feeder upon which the high frequency condition occurs.

5. In a system of distribution, the combination of a plurality of polyphase feeders, and an auxiliary circuit in series relation with each phase of said feeders comprising, a resistance, an inductance, and terminals mounted within an evacuated vessel to form a spark gap in series relation with said resistance, and in shunt relation with said inductance, said plurality of feeders having similar phases paired together through their respective auxiliary circuits to produce a differential action between them whereby said spark gaps are rendered unresponsive to normal conditions upon the phases of the feeders but rendered responsive to the occurrence of a high frequency condition upon any phase of any feeder to visually indicate the phase of the feeder upon which the high frequency condition occurs.

6. In a system of distribution, the combination with a plurality of feeders, of means for selectively indicating the occurrence of a high frequency condition on any of said feeders comprising differentially operated indicating devices responsive to conditions on each of said feeders, and means in shunt to said devices for maintaining them normally inoperative but for rendering them operative upon the occurrence of high frequency conditions to indicate the same.

7. In a system of distribution, the combination with a plurality of feeders, of high frequency indicators responsive to conditions on each phase of each feeder, a reactance in shunt to each indicator for rendering said indicator normally unresponsive but responsive on the occurrence of high frequency conditions to indicate the same, and means for rendering the indicators on similar phases of said feeders differentially acting whereby the feeder and phase on which a high frequency condition exists will be indicated.

8. In a system of distribution, the combination with a plurality of feeders, of an arcing ground detector for each feeder, and means in shunt to each detector for maintaining said detectors normally inoperative but for rendering them operative on conditions set up by an arcing ground to differentially indicate the feeder upon which said ground occurs.

In witness whereof, I have hereunto set my hand this 12th day of January, 1914.

ELMER E. F. CREIGHTON.

Witnesses:
BENJAMIN B. HULL,
HELEN ORFORD.